United States Patent [19]
Beavers et al.

[11] Patent Number: 5,294,483
[45] Date of Patent: Mar. 15, 1994

[54] COATING PAPER WITH COPOLYESTER

[75] Inventors: Randy S. Beavers; Sara S. Wells; James C. Williams, all of Kingsport, Tenn.

[73] Assignee: Eastman Chemical Company, Kingsport, Tenn.

[21] Appl. No.: 980,080

[22] Filed: Nov. 23, 1992

[51] Int. Cl.$^5$ .................. B32B 5/16; B32B 27/10; B65D 11/02
[52] U.S. Cl. .................. 428/336; 428/481; 428/514; 428/522; 264/176.1; 220/458
[58] Field of Search .............. 428/336, 481, 514, 522

[56] References Cited
U.S. PATENT DOCUMENTS

| | | | |
|---|---|---|---|
| 4,156,774 | 5/1979 | Buxbaum et al. | 528/273 |
| 4,352,925 | 10/1982 | Petke et al. | 528/309 |
| 4,381,356 | 4/1983 | Marsh | 523/521 |
| 4,543,280 | 9/1985 | Fjuita et al. | 428/514 |
| 5,132,391 | 7/1992 | White et al. | 528/272 |

FOREIGN PATENT DOCUMENTS 1110412 1/1958 Fed. Rep. of Germany .

Primary Examiner—P. C. Sluby
Attorney, Agent, or Firm—John F. Stevens; William P. Heath, Jr.

[57] ABSTRACT

Disclosed is a method of providing a thin copolyester coating on paper wherein the coating has good peel strength which comprises extruding a film of copolyester onto paper to form a coated sheet and passing the paper through a nip formed by a pair of cooperating chill and pressure rolls, wherein the copolyester consists essentially of repeat units from terephthalic acid, ethylene glycol, about 1.5–20 mol % of an aliphatic or cycloaliphatic glycol having 2 to 10 carbon atoms, and 0 to about 1.0 mol % of a polyfunctional branching agent. Also disclosed is the coated paper prepared by this method.

4 Claims, 1 Drawing Sheet

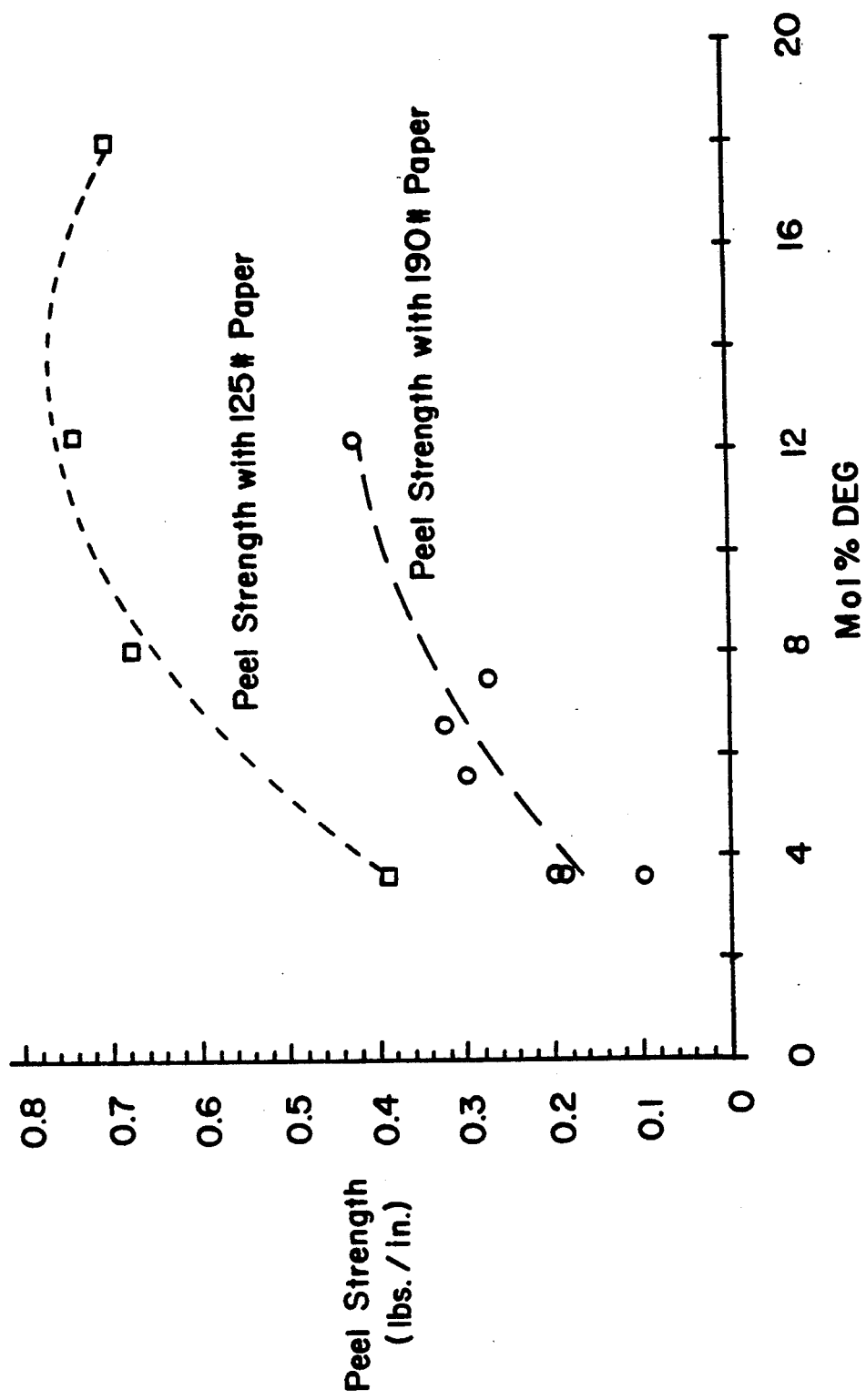

COATING PAPER WITH COPOLYESTER

TECHNICAL FIELD

This invention relates to a process for extrusion coating a copolyester onto paper whereby advantages such as improved adhesion and processability are obtained, allowing thinner coatings with resultant material cost savings.

BACKGROUND OF THE INVENTION

The paper extrusion coating industry currently uses polyolefins and poly(ethylene terephthalate) [PET] for food packaging applications. A thin layer of polymer is extrusion coated onto paper and the paperboard is used in various ways, such as being vacuum formed into containers for food and beverage packaging. Polyolefins are utilized in the paper extrusion coating industry, because of their excellent chemical resistance, low resin price and good adhesive characteristics. The good adhesive characteristics of polyolefins allow them to be extrusion coated onto paper in thin layers. Polyolefins are processed using low extruder motor loads and they have good melt stability, which minimizes the edge-weave (lateral variation in the edge of the coating) during extrusion. Due to their low melting transitions, polyolefins do not have the thermal characteristics needed for ovenable and microwaveable applications. In high temperature oven applications (>150° C.), PET is currently the extrusion coating resin of choice. PET offers good chemical resistance and can withstand end use temperatures of up to 425° F. (218.3° C.); however, at present, it does not have good adhesive properties to the paperboard. The lack of good adhesion requires converters to extrude thicker coating layers of polymer onto the paper to obtain acceptable adhesion, thereby adding to the expense. It was surprising to find that the addition of small quantities of a glycol such as diethylene glycol (DEG) had a significant effect on the adhesive characteristics of linear and branched PET extrusion coated onto paper.

German Patent No. 1,110,412 discloses films of high molecular weight terephthalate polyesters based on at least one glycol $HO(CH_2)_nOH$ where $n=2-10$ and 2 to 5 mol % of a polyglycol which may be diethylene glycol. In this application the diethylene glycol was added to reduce the crystallinity so the that the film could be oriented.

U.S. Pat. No. 4,352,925 discloses heat-resistant adhesive copolyesters derived from terephthalic acid, 30–50 mol % of diethylene glycol and at least 50 mol % of ethylene glycol. These copolyesters are suitable for bonding parts of ovenable food containers.

U.S Pat. No. 4,156,774 discloses thermoplastic copolyesters based on 40–50 mol % of terephthalic acid, 0–10 mol % of aliphatic, cycloaliphatic or other aromatic dicarboxylic acids, 15–30 mol % of ethylene glycol and 15–34.5 mol % of diethylene glycol. These copolyesters are suitable as hot melt adhesives, but were not suggested as being useful in extrusion coating applications.

U.S. Pat. No. 5,132,391 discloses polyester adhesive compositions which exhibit increased melt viscosity and improved adhesion. The copolyesters are derived from terephthalic acid, 75–50 mol % of ethylene glycol and 25–50 mol % of diethylene glycol reacted therewith or copolymerized with a phosphite ester and optionally containing a phenolic antioxidant. Also, disclosed are articles coated with the polyester compositions and bonded laminate articles based on the compositions.

U.S. Pat. No. 4,381,356 discloses polypropylene compositions, which contain an inert particulate filler and a copolyester which greatly increases the heat stability of articles produced therefrom. The copolyesters are described as amorphous polyesters derived from terephthalic acid, at least 50 mol % of ethylene glycol and 20–50 mol % of diethylene glycol or 1,4-cyclohexanedimethanol.

The present invention provides copolyesters that may be extrusion coated in very thin layers onto paperboard in conventional extrusion coating processes, the coating having significantly better adhesion to the paper than conventional PET.

BRIEF DESCRIPTION OF THE DRAWINGS

The FIG. is a graph showing the relationship of peel strength to mol % DEG in polyesters used in accordance with the present invention.

DESCRIPTION OF THE INVENTION

According to the present invention, there is provided a method of applying a copolyester coating having a thickness of about 0.75 to about 2.0 mils on paper wherein the coating has a peel strength of about 0.25 lb/in. to about 0.10 lb/in. which comprises extruding a molten film of copolyester onto the surface of the paper to form coated paper, and passing the coated paper through a nip formed by a pair of cooperating chill and pressure rolls, the copolyester consisting essentially of repeat units from terephthalic acid, ethylene glycol, about 1.5–20 mol % of an aliphatic or cycloaliphatic glycol having 2 to 10 carbon atoms, and 0 to about 1.0 mol % of a polyfunctional branching agent, the polyester having an I.V. of about 0.55 to about 0.85, and a melting temperature of greater than 215° C.

Also, according to the present invention, there is provided an article of manufacture comprising paper having a copolyester coating thereon, the coating having a thickness of about 0.75 to about 2.0 mils and a peel strength of at least 0.25 lb/in., and the copolyester consisting essentially of repeat units from terephthalic acid, ethylene glycol, about 1.5–20 mol % of an aliphatic or cycloaliphatic glycol having 2 to 10 carbon atoms, and 0 to about 1.0 mol % of a polyfunctional branching agent, the copolyester having an I.V. of about 0.55 to about 0.85 at a melting temperature of greater than 215° C.

The molten film of polyester is extruded onto the surface of paper using well known, conventional techniques. Generally, an extruder is used in which copolyester pellets are fed, melted, and extruded as a molten film through a die having a narrow slit. The molten film is directed onto the surface of the paper. Preferably, the paper is of a continuous length, and is moved from a supply roll along a predetermined path, through a pair of nip rolls, and rewound. Just prior to the nip rolls, the extruded, molten copolyester film is brought into contact with a surface of the paper. The nip rolls may conveniently be a pair of cooperating, axially parallel rolls, one being a pressure roll having a rubber surface and the other being a chill roll. The uncoated side of the paper contacts the pressure roll, and the side with the copolyester coating is contacted by the chill roll. The chill roll is maintained at a cool temperature of about 10° to 38° C. by well-known means, such as by circulating water. The chill roll serves to cool the copolyester coating to aid in solidifying it.

The copolyesters of this invention may be made by typical melt phase and solid state polycondensation techniques known to those skilled in the art. A variety of well known catalysts may be used and may include catalysts based on titanium, manganese, antimony, phosphorus, cobalt, germanium, tin and the like or mixtures of these materials. The copolyesters suitable for extrusion coating applications generally have inherent viscosities (I.V.) of about 0.55–0.85 dl/g. If a two step process is utilized to produce the copolyester (melt phase+solid state polycondensation), a precursor I.V. of 0.30–0.60 dl/g is first produced in the melt phase. The precursor is then solid state polymerized to the target molecular weight. The target I.V. may also be obtained by melt phase polycondensation of the polymer to the target molecular weight.

The copolymers are produced from terephthalic acid, ethylene glycol and at least one other glycol having 2 to 10 carbon atoms. It is also possible to start with a dialkyl terephthalate ester such as dimethyl terephthalate and to transesterify it with the glycol moieties prior to the melt phase polycondensation reaction. Small amounts of other dibasic acids or their esters may be used if desired. For example, up to about 10 mol % of other acids such as succinic, adipic suberic, isophthalic, naphthalenedicarboxylic, cyclohexanedicarboxylic acid and the like may be used.

It was found that increasing the glycol concentration in PET significantly improved the adhesion of the polyester coating layer to the paperboard. The increase in adhesive properties may improve the adhesion of lid stock to the paper coated containers. It is well known that DEG is formed in situ during the synthesis of PET; however, this invention calls for higher levels of glycol than those formed in conventional PET synthesis processes. Glycol concentrations in the copolyesters of this invention generally range from about 1.5–20.0 mol %, while the preferred concentrations are about 4.0 to 12.0 mol %. While it is expected that higher levels of glycol will give better adhesion of the PET to the paper, the copolyester must maintain a melting point greater than the end use temperatures realized in ovenable applications. For conventional oven applications, this is 425° F. (218.3° C.). Although DEG is much preferred due to performance, price and availability, other glycols may be incorporated into the polymer to enhance the adhesion of the PET to paper. These glycols include propanediol, butanediol, 1,4-cyclohexanedimethanol (CHDM), poly(oxyethylene glycol), poly(oxypropylene glycol), poly(oxytetramethylene glycol) and the like. Either the cis, trans or cis/trans isomer mixtures of 1,4-cyclohexanedimethanol may be used.

The copolyesters may be synthesized in a batchwise or a continuous process. In addition to linear copolyesters described above, copolyesters containing up to 1.0 mol % of a polyfunctional branching agent may be incorporated into the polymer. Useful branching agents include pyromellitic dianhydride or pyromellitic diacid, tricarboxylic acids or ester forming derivatives thereof such as tricarboxylic acids or ester forming derivatives thereof such as trimellitic (1,2,4-benzenetricarboxylic) acid and anhydride, hemimellitic (1,2,3-benzenetricarboxylic) acid and anhydride, trimesic (1,3,5-benzenetricarboxylic) acid and tricarballyic (1,2,3-propanetricarboxylic) acid. Generally, any tricarboxylic residue containing about 6 to 9 carbon atoms may be used. The trifunctional residue also may be derived from an aliphatic triol containing about 3 to 8 carbon atoms such as glycerin, trimethylolethane and trimethylolpropane. The amount of the trifunctional monomer residue present in the copolyester preferably is in the range of about 0.05 to 0.60 mol %. The preferred trifunctional monomer residues are residues of benzenetricarboxylic acids (including anhydrides), especially trimellitic acid or anhydride. The addition of a branching agent produces an extrusion coating polymer that can be coated onto paper with less edge weave and lower motor loads. The increase in melt viscosity as a result of the chain branching gives a more stable melt that shear thins when processed. The shear-thinning characteristics gives a polymer that produces less motor load and can be processed at faster extrusion coating rates.

The polymers in the examples below were extrusion coated onto paper by feeding pellets into a 2.5 inch commercial extruder having a barrel length to diameter ratio of 28:1. The five zones of the extruder were maintained from 277°–332° C. A single flight screw having eight compression flights, four metering flights, a two flight mixing section and six metering flights was used in the extruder. The molten polymer was passed through three 24×24 mesh screens. The polymer passed through a center fed die with 0.75 inch lands having a die opening of 36 inches×0.02 inches. The extrusion feed rate was held constant at 462.6 pounds per hour. The resulting extrudate was passed through a 5 inch air gap into the nip formed by a rubber-covered pressure roll and a chilled roll. At the same time either a 125 pound or a 190 pound bleached paperboard stock that was 32 inches wide was fed into the nip with the roll in contact with the film. A nip pressure of 100 pounds per linear inch was applied. A 24 inch diameter mirror finished chill roll was maintained at 19° C. during the extrusion trials. The coated paperboard was taken off the chill roll at a point 180 degrees from the nip formed by the pressure roll and the chill roll. The chill roll was operated at linear speeds of 300 feet per minute. At this coating speed, a polyester coating thickness of 1.25 mils was obtained.

The adhesive strength was determined by a method based upon ASTM Test Method D1876. An Instron Model 1125 tensile testing machine was utilized for the adhesive measurements. The test specimens (8 inches in length and 1 inch wide) were allowed to equilibrate for 24 hours at 23° C. at 50±5% relative humidity immediately prior to testing. The polymeric layer was separated from the paper substrate and placed in the jaws of the tensile tester, with the jaws set 2 inches apart. A 50-pound load cell was applied to the test specimen using a jaw separation rate of 2 inches/minute. Provisions were made to keep the bonded portion of the specimen horizontal so that the angle of separation from the paper was 180 degrees. Eight test specimens were evaluated for each composition.

A DuPont Model 912 Differential Scanning Calorimeter fitted with a DuPont Model 920 Autosampler using a heating rate of 20° C. per minute was used to determine the melting point of the polymers.

The following examples are submitted for a better understanding of the invention.

In the examples, copolyesters having repeat units from the indicated monomers are used. All of the polymers were synthesized using dimethyl terephthalate. TPA is terephthalic acid, EG is ethylene glycol, DEG is diethylene glycol, TMA is trimelletic anhydride, and CHDM is 1,4-cyclohexanedimethanol. The paper was either 125 pound/ream or 190 pound/ream bleached paperboard stock, 32 inches wide. Peel strengths are an average of eight samples. In the examples, lb polymer/RPM means lb/hour of polymer extruded for a given extruder RPM. Line speed means the speed of the paper being coated. Screw speed is the revolutions per minute of the extruder screw.

| Example | Monomers | |
|---|---|---|
| 1 | TPA | 100 mol % |
|  | EG | 96.4 mol % |
|  | DEG | 3.60 mol % |
|  | TMA | 0.0 mol % |
| 2 | TPA | 100 mol % |
|  | EG | 96.4 mol % |
|  | DEG | 3.6 mol % |
|  | TMA | 0.0 mol % |
| 3 | TPA | 99.51 mol % |
|  | EG | 96.37 mol % |
|  | DEG | 3.63 mol % |
|  | TMA | 0.49 mol % |
| 4 | TPA | 99.52 mol % |
|  | EG | 94.43 mol % |
|  | DEG | 5.57 mol % |
|  | TMA | 0.48 mol % |
| 5 | TPA | 99.55 mol % |
|  | EG | 93.44 mol % |
|  | DEG | 6.56 mol % |
|  | TMA | 0.45 mol % |
| 6 | TPA | 99.50 mol % |
|  | EG | 92.49 mol % |
|  | DEG | 7.51 mol % |
|  | TMA | 0.50 mol % |
| 7 | TPA | 99.54 mol % |
|  | EG | 87.80 mol % |
|  | DEG | 12.20 mol % |
|  | TMA | 0.46 mol % |
| 8 | TPA | 100.0 mol % |
|  | EG | 96.4 mol % |
|  | DEG | 3.60 mol % |
|  | TMA | 0.0 mol % |
| 9 | TPA | 100.0 mol % |
|  | EG | 92.0 mol % |
|  | DEG | 8.0 mol % |
|  | TMA | 0.0 mol % |
| 10 | TPA | 100 mol % |
|  | EG | 82.0 mol % |
|  | DEG | 18.0 mol % |
|  | TMA | 0.0 mol % |
| 11 | TPA | 99.54 mol % |
|  | EG | 87.80 mol % |
|  | DEG | 12.20 mol % |
|  | TMA | 0.46 mol % |
| 12 | TPA | 100.0 mol % |
|  | EG | 93.80 mol % |
|  | CHDM | 3.50 mol % |
|  | DEG | 2.70 mol % |
|  | TMA | 0.0 mol % |

EXAMPLE 1

Copolyester was dried in a desiccant air dryer with a dew point of −40° C. for four hours at 150° C. The copolyester was extrusion coated on to 190 lb/ream paperboard in the extrusion coating process described above. The paper was coated with 1.25 mils of copolyester using the following extrusion coating conditions:

| | |
|---|---|
| Melt Temperature (°C.) | 347 |
| Lb Polymer/RPM | 2.57 |
| Screw Speed (RPM) | 177 |
| Line Speed (ft/min) | 300 |

The adhesion strength of the copolyester to the paper was 0.100±0.000 lb/in. based on 95% confidence limits.

EXAMPLE 2

Copolyester was dried in a desiccant air dryer with a dew point of −40° C. for four hours at 150° C. The polymer was extrusion coated on to 190 lb/ream paperboard in the extrusion coating process described above. The paper was coated with a 1.25 mils of polyester using the following extrusion coating conditions:

| | |
|---|---|
| Melt Temperature (°C.) | 347 |
| Lb Polymer/RPM | 2.57 |
| Screw Speed (RPM) | 1.77 |
| Line Speed (ft/min) | 300 |

The adhesion strength of the polyester to the paperboard was 0.188±0.043 lb/in.

EXAMPLE 3

The experimental samples were synthesized in a batch pilot plant consisting of an ester exchange reactor, a prepolymer reactor and a polycondensation reactor. To an ester exchange reactor was added 400 pounds of dimethyl terephthalate, 192.5 pounds of ethylene glycol, 99.6 grams of antimony triacetate, 60.3 grams of manganese acetate, 25.9 grams of acetyl triisopropyltitanate. The ester exchange reaction was completed at 195° C. to 230° C. under a nitrogen atmosphere over 3 hours. To the monomer was added 60.9 grams of cobalt acetate, 281.6 grams of polyethylene glycol phosphate which was 8.0 wt/vol % phosphorus and 5.720 pounds of an ester of trimellitic anhydride and ethylene glycol that was 34% trimellitic anhydride. The polymer reaction was completed at 230° C., while reducing the pressure from atmospheric to 300 mm Hg over a 1-hour period. Polycondensation was completed at 285° C. using a vacuum of 0.5 mm Hg over a period of 1 hour. The copolymer was discharged through a rod die, quenched in a water batch and pelletized. The amorphous pellets were crystallized in a batch crystallizer by heating the pellets with stirring to 165° C. in a nitrogen atmosphere for four hours. The assay of the copolyester is shown in Table 1. The crystalline pellets were dried in a desiccant air dryer with a dew point of −40° C. for four hours at 150° C. The copolyester was extrusion coated on to 190 lb/ream paperboard using the following processing conditions:

| | |
|---|---|
| Melt Temperature (°C.) | 349 |
| Lb Polymer/RPM | 2.40 |
| Screw Speed (RPM) | 180 |
| Line Speed (ft/min) | 300 |

The adhesion strength of the polyester to the paperboard was 0.200±0.076 lb./in.

EXAMPLE 4

The copolyester was prepared as described in example 3, except that 3.5 mol % of DEG was added to the reactor after ester exchange. The amorphous pellets were crystallized in a batch crystallizer by heating the pellets with stirring to 165° C. in a nitrogen atmosphere for four hours. An assay of the polymer is shown in Table 1. The crystalline pellets were dried in a desiccant air dryer with a dew point of −40° C. for four hours at 150° C. The copolyester was extrusion coated on to 190 lb/ream paper using the following processing conditions:

| Melt Temperature (°C.) | 342 |
|---|---|
| Lb Polymer/RPM | 2.46 |
| Screw Speed (RPM) | 180 |
| Line Speed (ft/min) | 300 |

The peel strength of the polyester to the paperboard was 0.300±0.053 lb/in.

EXAMPLE 5

The copolyester was prepared as described in example 3, except that 4.5 mol % of DEG was added to the reactor after ester exchange. The amorphous pellets were crystallized in a batch crystallizer by heating the pellets with stirring to 165° C. in a nitrogen atmosphere for four hours. An assay of the polymer is shown in Table 1. The crystalline pellets were dried in a desiccant air dryer with a dew point of −40° C. for four hours at 150° C. The copolyester was extrusion coated on to 190 lb/ream paper using the following processing conditions:

| Melt Temperature (°C.) | 344 |
|---|---|
| Lb Polymer/RPM | 2.57 |
| Screw Speed (RPM) | 177 |
| Line Speed (ft/min) | 300 |

The peel strength of the polyester to the paperboard was 0.325±0.059 lb/in.

EXAMPLE 6

A branched copolyester precursor was synthesized to an I.V. of 0.58 dl/g as described in example 3, except that 5.5 mol % of DEG was added to the reactor after ester exchange. The precursor was solid state polymerized in a double-coned Patterson dryer at 205° C. using a nitrogen purge of 4 standard cubic feet per minute to an I.V. of 0.636 dl/g. Table 1 contains additional compositional information. The crystalline pellets were dried in a desiccant air dryer with a dew point of −40° C. for four hours at 150° C. The copolyester was extrusion coated on to 190 lb/ream paperboard using the following processing conditions:

| Melt Temperature (°C.) | 341 |
|---|---|
| Lb Polymer/RPM | 2.74 |
| Screw Speed (RPM) | 157 |
| Line Speed (ft/min) | 300 |

The peel strength of the polyester to the paperboard was 0.275±0.069 lb/in.

EXAMPLE 7

An unbranched copolyester precursor was synthesized to an I.V. of 0.55 dl/g as described in example 3, except that 8.5 mol % of DEG was added to the reactor after ester exchange. The precursor was solid state polymerized in a double coned Patterson dryer at 205° C. with a nitrogen purge of 4 standard cubic feet per minute to an I.V. of 0.608 dl/g. Additional compositional information is shown in Table 1. The crystalline pellets were dried in a desiccant air dryer with a dew point of −40° C. for four hours at 150° C. The copolyester was extrusion coated on to 190 lb/ream paper using the following processing conditions:

| Melt Temperature (°C.) | 334 |
|---|---|
| Lb Polymer/RPM | 2.76 |
| Screw Speed (RPM) | 170 |
| Line Speed (ft/min) | 300 |

The peel strength of the polyester to the paperboard was 0.425±0.106 lb/in.

EXAMPLE 8

A copolyester was dried in a desiccant air dryer with a dew point of −40° C. for four hours at 150° C. The polymer was extrusion coated onto 125 pound per ream paper board. The paper was coated with 1.25 mils of polyester using the following extrusion conditions:

| Melt Temperature (°C.) | 344 |
|---|---|
| Lb Polymer/RPM | 2.65 |
| Screw Speed (RPM) | 173 |
| Line Speed (ft/min) | 300 |

The peel strength of the polyester to the paperboard was 0.387±0.036 lb/in.

EXAMPLE 9

A copolyester precursor was synthesized to an inherent viscosity of 0.665 dl/g as described in example 3, except that 5.8 mol % of DEG was added to the reactor after ester exchange. This sample did not contain any of the trimellitic anhydride/ethylene glycol ester. The amorphous pellets were crystallized in a batch crystallizer by heating the pellets with stirring to 165° C. in a nitrogen atmosphere for four hours. An assay of the polymer is shown in Table 1. The crystalline pellets were dried in a desiccant air dryer with a dew point of −40° C. for four hours at 150° C. The copolyester was extrusion coated on to 125 lb/ream paper using the following processing conditions:

| Melt Temperature (°C.) | 335 |
|---|---|
| Lb Polymer/RPM | 3.00 |
| Screw Speed (RPM) | 152 |
| Line Speed (ft/min) | 300 |

The peel strength of the polyester to the paperboard was 0.675±0.133 lb/in.

EXAMPLE 10

An unbranched copolyester precursor was synthesized to an I.V. of 0.725 dl/g as described in example 3, except that 13.5 mol % of DEG was added to the reactor after ester exchange. The amorphous pellets were crystallized in a batch crystallizer by heating the pellets with stirring to 165° C. in a nitrogen atmosphere for four hours. An assay of the polymer is shown in Table 1. The crystalline pellets were dried in a desiccant air dryer with a dew point of −40° C. for four hours at 150° C. The copolyester was extrusion coated on to 125 lb/ream paper using the following processing conditions:

| Melt Temperature (°C.) | 330 |
|---|---|
| Lb Polymer/RPM | 2.78 |
| Screw Speed (RPM) | 170 |
| Line Speed (ft/min) | 300 |

The peel strength of the polyester to the paperboard was 0.485±0.085 lb/in.

EXAMPLE 11

The polymer sample described in Example 7 was extrusion coated onto 125 lb/ream paperboard using the following processing conditions:

| Melt Temperature (°C.) | 325 |
|---|---|
| Lb Polymer/RPM | 2.85 |
| Screw Speed (RPM) | 160 |
| Line Speed (ft/min) | 300 |

The peel strength of the polyester to the paperboard was 0.737±0.156 lb/in.

EXAMPLE 12

Copolyester was dried in a desiccant air dryer with a dew point of −40° C. for four hours at 150° C. Note that this copolyester contains 3.5 mol % of 1,4-cyclohexanedimethanol. The copolyester was extrusion coated on to 190 lb/ream paperboard in the extrusion coating process described above. The paper was coated with a 1.25 mils of polyester using the following extrusion coating conditions:

| Melt Temperature (°C.) | 354 |
|---|---|
| Lb Polymer/RPM | 2.77 |
| Screw Speed (RPM) | 165 |
| Line Speed (ft/min) | 300 |

The adhesion strength of the polyester to the paper was 0.478±0.069 lb/in. based on 95% confidence limits.

The mol % glycols were determined by gas chromatography. To a 125 mL Erlenmeyer flask was weighed 1.0 g of polymer. To the flask was added 30 mL of 1.0 N KOH/1-propanol solution. The sample was heated with stirring for 60 minutes at 300° C. After cooling to room temperature, 3 mL of concentrated HCL was added to the mixture and 20.0 mg nonyl alcohol/5 mL 1-propanol was added to the flask. Approximately 15 mL of the solution is centrifuged for 15 min at 3000 rpm. Approximately 0.20 mL of centrifuged solution is added to a test vial and analyzed using either a HP 5880 or HP 5890 gas chromatograph.

The wt % TMA was determined by liquid chromatography. To a Pyrex culture tube was weighed 0.15 g of polymer. To the polymer was added 10 mL of 0.5 N KOH in a methanol/dimethylsulfoxide solution. The polymer and KOH solution was heated with stirring for 30 minutes at 120° C. After cooling, the samples were quantitatively transferred to 100 mL volumetric flasks and diluted to the mark with 0.2 N phosphate buffer/acetonitrile in a ratio of 9:1, respectively. After filtering, the samples were analyzed using a HP 1090 HPLC equipped with a stainless steel Whatman Partisil packed column.

As used herein, the inherent viscosity (I.V.) is measured at 25° C., using 0.50 g of polymer per 100 mL of a solvent consisting of 60% by weight phenol and 40% by weight tetrachloroethane.

The melting points were measured using conventional DSC (differential scanning colorimetry) techniques.

Unless otherwise specified, all parts, ratios, percentages, etc. are by weight.

The invention has been described in detail with particular reference to preferred embodiments thereof, but it will be understood that variations and modifications can be effected within the spirit and scope of the invention.

We claim:

1. An article of manufacture comprising paper sheet material having a copolyester coating thereon, said coating having a thickness of about 0.75 to about 2.0 mils and a peel strength of at least 0.25 lb/in., and said copolyester consisting essentially of repeat units from terephthalic acid, ethylene glycol, about 1.5–20 mol % of an aliphatic or cycloaliphatic glycol having 2 to 10 carbon atoms, and 0 to about 1.0 mol % of a polyfunctional branching agent, said copolyester having an inherent viscosity of about 0.55 to about 0.85 and a melting temperature of greater than 215° C.

2. The article according to claim 1 wherein said glycol is diethylene glycol.

3. The article according to claim 1 wherein said polyfunctional branching agent is trimellitic acid or pyromellitic dianhydride.

4. The article according to claim 1 wherein said copolyester contains about 0.40 mol % branching agent.

* * * * *

TABLE 1

Effect of Diethylene Glycol on the Adhesive Strength of Polyester

| Example | Pellet I.V. dl/g | TMA Mol % | DEG Mol % | CHDM Mol % | Tm °C. | Paper Type | Coating Thickness mil | Peel Strength lb/in. |
|---|---|---|---|---|---|---|---|---|
| 1 | 0.705 | 0.00 | 3.60 | 0.00 | 252.00 | 190 lb/Ream | 1.25 | 0.100 |
| 2 | 0.705 | 0.00 | 3.60 | 0.00 | 252.00 | 190 lb/Ream | 1.25 | 0.188 |
| 3 | 0.649 | 0.49 | 3.63 | 0.00 | 253.00 | 190 lb/Ream | 1.25 | 0.200 |
| 4 | 0.652 | 0.48 | 5.57 | 0.00 | 222.8, 235.2 | 190 lb/Ream | 1.25 | 0.300 |
| 5 | 0.640 | 0.45 | 6.56 | 0.00 | 218.3, 235.1 | 190 lb/Ream | 1.25 | 0.325 |
| 6 | 0.636 | 0.50 | 7.51 | 0.00 | 215.2, 233.5 | 190 lb/Ream | 1.25 | 0.275 |
| 7 | 0.608 | 0.46 | 12.20 | 0.00 | 218.0, 232.0 | 190 lb/Ream | 1.25 | 0.425 |
| 8 | 0.705 | 0.00 | 3.60 | 0.00 | 252.0 | 125 lb/Ream | 1.25 | 0.387 |
| 9 | 0.665 | 0.00 | 8.00 | 0.00 | 217.2, 233.1 | 125 lb/Ream | 1.25 | 0.675 |
| 10 | 0.725 | 0.00 | 18.00 | 0.00 | 218.20 | 125 lb/Ream | 1.25 | 0.700 |
| 11 | 0.608 | 0.46 | 12.20 | 0.00 | 218.0, 232.0 | 125 lb/Ream | 1.25 | 0.737 |
| 12 | 0.76 | 0.00 | 2.70 | 3.50 | 245.30 | 125 lb/Ream | 1.25 | 0.478 |